Nov. 18, 1969  L. H. FENSTERMAKER ET AL  3,478,407
APPARATUS FOR MANIPULATING DISC-LIKE MEMBERS
Filed Dec. 11, 1967  4 Sheets-Sheet 3
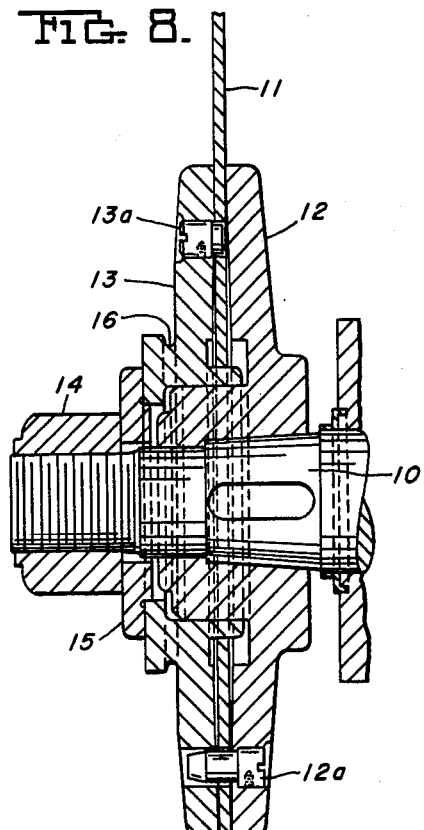
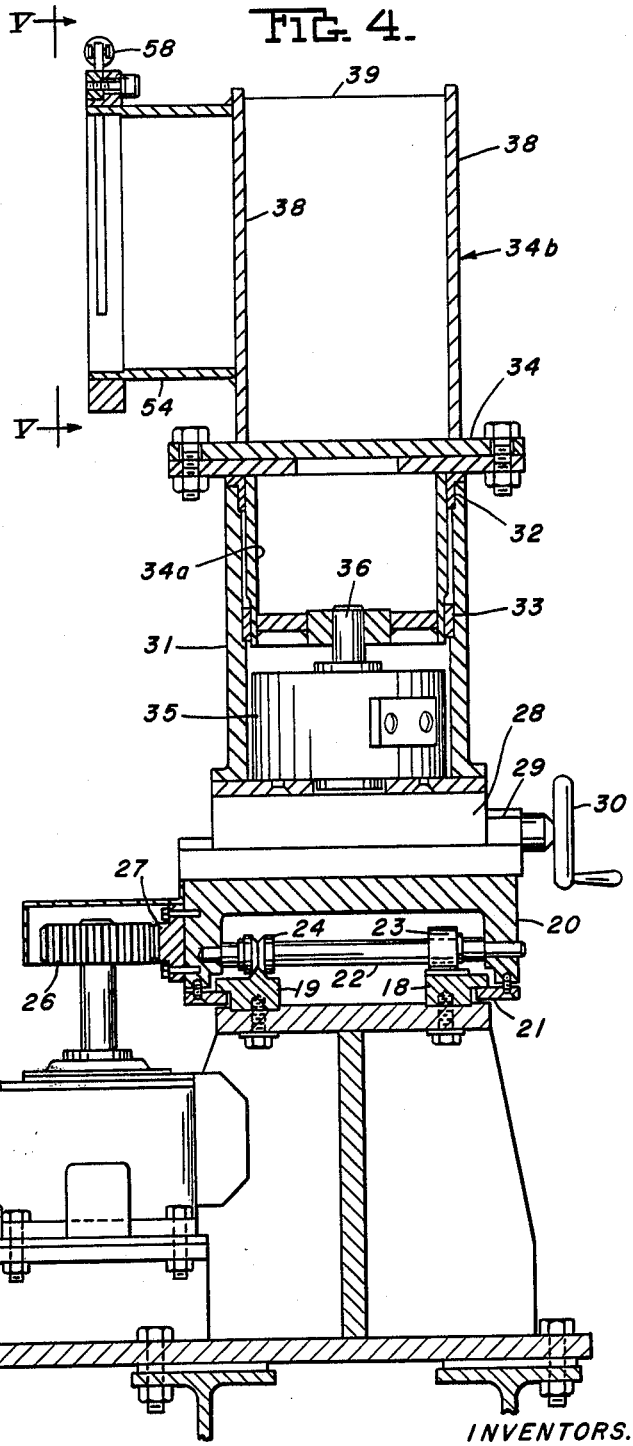
INVENTORS.
LLOYD H. FENSTERMAKER &
QUIN SHEN YU
By J. Mallon Hopkins
Attorney

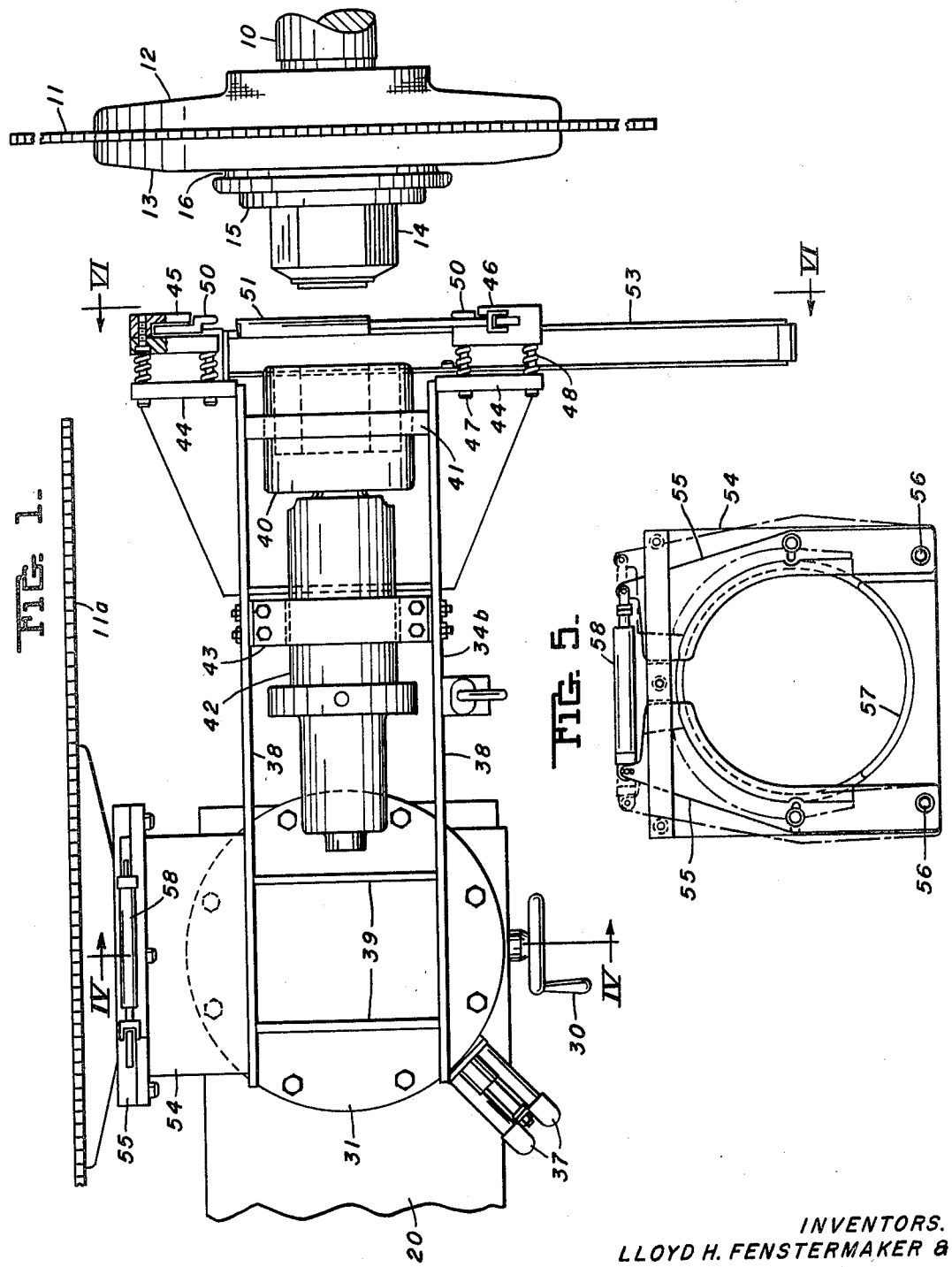

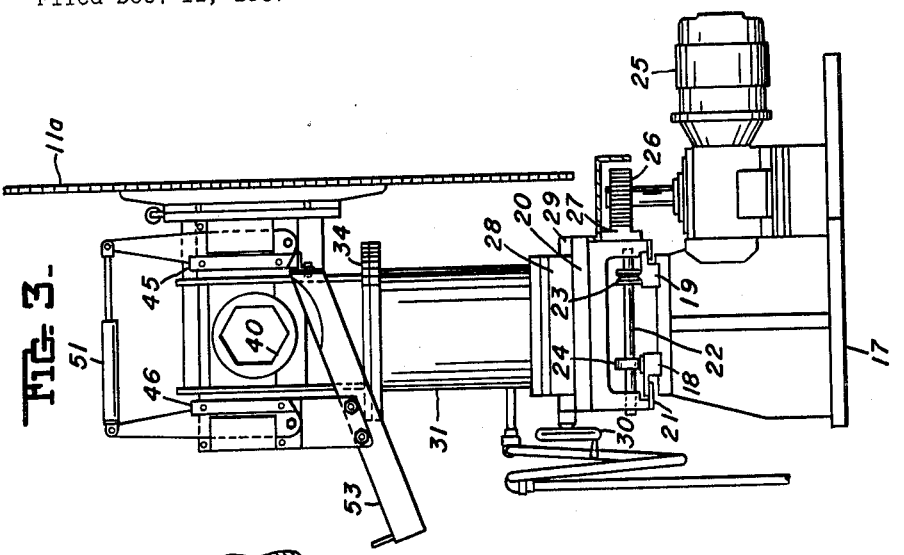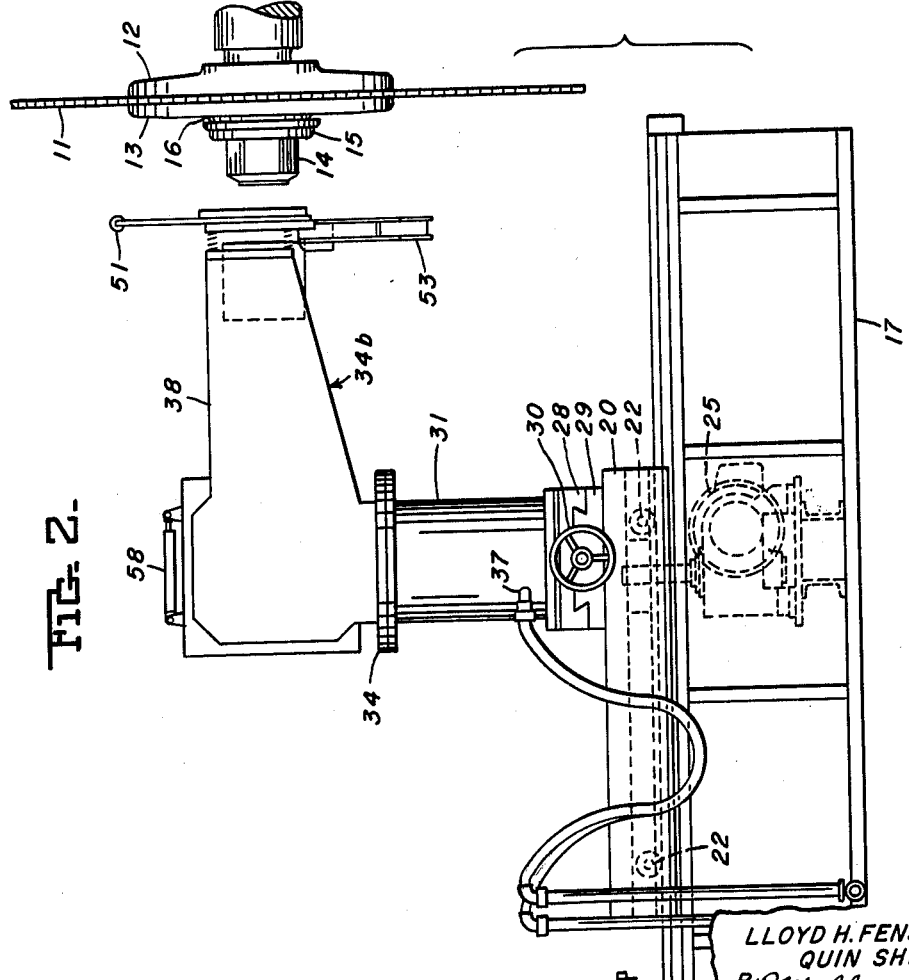

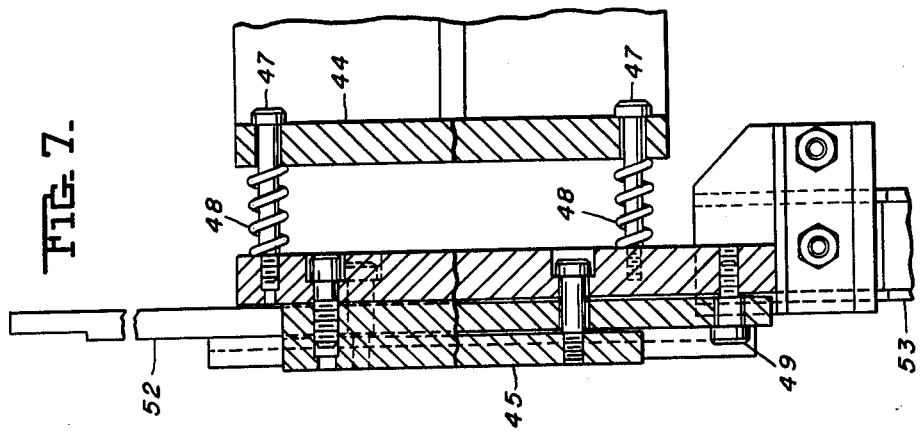
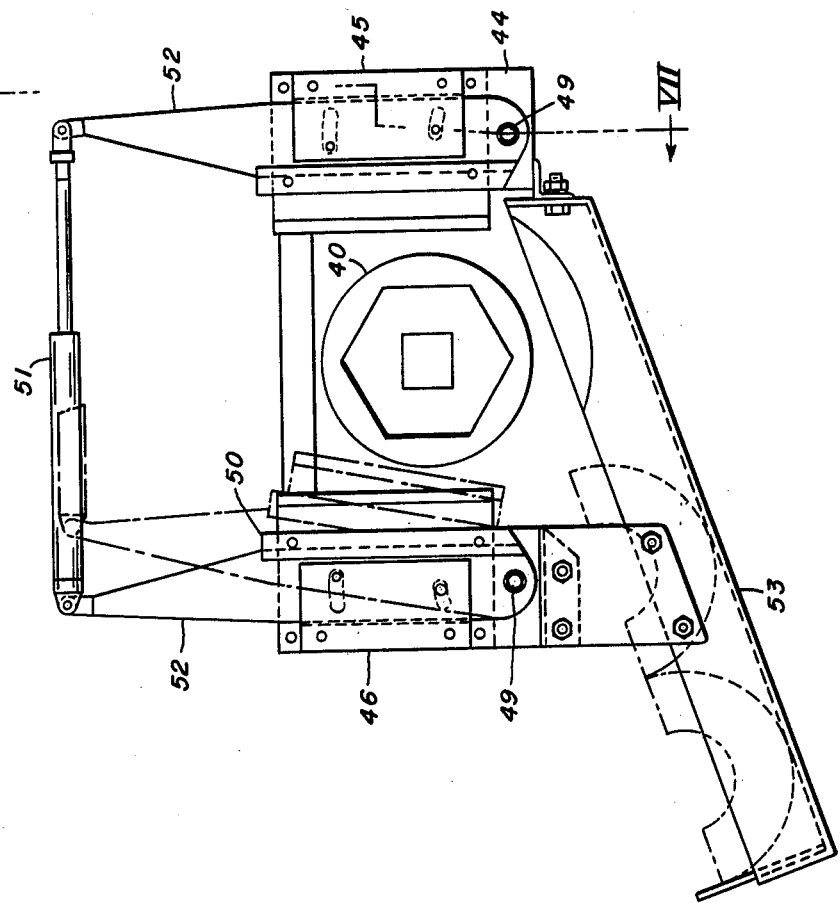

3,478,407
**APPARATUS FOR MANIPULATING
DISC-LIKE MEMBERS**
Lloyd H. Fenstermaker, Whitehall Borough, and Quin
Shen Yu, Forest Hills Borough, Pa., assignors to
United States Steel Corporation, a corporation of
Delaware
Filed Dec. 11, 1967, Ser. No. 689,685
Int. Cl. B23p 19/04
U.S. Cl. 29—240                                       7 Claims

ABSTRACT OF THE DISCLOSURE

Apparatus for removing a saw blade from its arbor and replacing it comprises a base having a ram thereon reciprocable toward and from the arbor along the axis thereof. A cross slide on the ram mounts a turret provided with a cantilever arm having a power wrench for turning a nut on the arbor and jaws for seizing a blade to be removed. At an angle to the arm, a set of blade-applying jaws is mounted on the turret, to support a blade for placement on the arbor after the used blade has been removed and the turret rotated through a predetermined angle.

---

This invention relates to apparatus for handling large, heavy disc-like members, e.g., saws for severing metal slabs while still hot from casting and rolling.

Metal slabs of great length, such as those produced by continuous casting, must be cut to length before hot rolling and this is conveniently effected by a rotary saw mounted on a carriage movable transversely of the slab. Saw blades for cutting thick, wide slabs are naturally of considerable size and weight. The changing of blades, which must be effected periodically because of wear, thus presents a difficult problem. Handling of the saw blades by an overhead crane supplementing manual effort consumes a substantial amount of time and involves a safety hazard to personnel. The slab-casting line, of course, must be shut down while saw blades are being changed, interrupting production of a facility of high capital cost.

We have invented specialized apparatus for changing saw blades whereby the necessary operations are performed by power means thus reducing the time consumed and avoiding risk of injury to operators. In a preferred embodiment, we mount a reciprocable ram for longitudinal movement toward and from the arbor of the saw-blade drive along the axis of the arbor. A cross slide on the ram mounts a turret for rotation about a vertical axis. A cantilever arm projecting from the turret has a power-wrench for the nut securing a blade to the arbor and blade-removing jaws adapted to engage a blade in position on the arbor and pull it therefrom. A set of blade-applying jaws on the turret holds a replacement blade ready for installation on the arbor after the used blade has been removed and the turret rotated through the proper angle.

A complete understanding of the invention may be obtained from the following detailed description and explanation which refer to the accompanying drawings illustrating the present preferred embodiment. In the drawings:

FIGURE 1 is a plan view;
FIGURE 2 is a side elevation; both FIGURES 1 and 2 show partially the arbor of the saw-blade drive;
FIGURE 3 is an end view looking from the arbor;
FIGURE 4 is a vertical section taken along the plane of line IV—IV of FIGURE 1;
FIGURE 5 is an elevation of the blade-applying jaws as would be seen projected on the plane of line V—V of FIGURE 4;

FIGURE 6 is an elevation to enlarged scale of the blade-removing jaws as would be projected on the plane of line VI—VI of FIGURE 1;
FIGURE 7 is a section taken along the plane of line VII—VII of FIGURE 6; and
FIGURE 8 is a section through a saw-blade, mounted on the arbor of the blade driving device and secured by a nut.

Referring now in detail to the drawings and, for the present, to FIGURES 1–4 particularly, the arbor 10 of a saw-blade drive has a blade 11 mounted thereon between clamping discs 12 and 13 secured together by a nut 14 threaded on the end of the arbor with a split washer 15 thereunder. Disc 13 has a recess or groove 16 in the outer face thereof for a purpose shortly to be explained.

Referring for the moment to FIGURE 8, disc 12 is fixed on arbor 10 and is not removed on changing blades. When nut 14 is loosened, the segments of washer 15 fall out whereupon the central openings in blade 11 and disc 13 will clear nut 14. It is therefore unnecessary to remove the nut entirely from the arbor. Dowels 12a provide torque-transmitting relation between disc 12 and the blade and dowels 13a assure proper registry of the blade and arbor.

A base 17 (FIGURES 2 and 4) fabricated from plate has flat and inverted V-rails 18 and 19, respectively, extending longitudinally thereof, parallel to the axis of arbor 10. A ram 20, gibbed to the rails as at 21, has transverse shafts 22 journaled therein. Rollers 23 and 24 on the shafts ride on the rails. Reciprocation of the ram is effected by a gear motor 25 on base 17, through an output spur gear 26 meshing with a rack 27 secured to one side of the ram. A cross slide 28 travels on ways 29 secured to the top of ram 20, and is actuated by a feed screw on which a hand wheel 30 is secured.

A cylinder 31 upstanding on slide 28 has bearings 32 and 33 therein in which is journaled a turret 34, including a hub 34a and a cantilever arm 34b. A hydraulic torque motor 35 seated in cylinder 31 has a central output shaft 36 keyed to hub 34a. Pipe and hose connections 37 extending through the wall of cylinder 31 to motor 35 permit operation thereof in either direction under control of a manual valve (not shown). Arm 34b is formed by space side plates 38 standing edgewise on hub 34a and connected by spaced transverse plates 39. A wrench socket 40 for nut 14 is journaled in a bearing ring 41 extending between plates 38. A gear motor 42 mounted in a clamping ring 43 secured to plates 38 is connected to socket 40 for turning it in one direction or the other.

Abutment plates 44 extend laterally from plates 38, respectively, at the outer ends thereof. Spaced blade-removing jaws 45 and 46 are retractably supported in front of plates 44 by bolts 47. Compression springs 48 on the bolts permit jaws 45 and 46 to be pushed back a limited distance toward plates 44. Extensions 52 are pivoted on jaws 45 and 46 at 49 and may be caused to tilt as shown in chain lines in FIGURE 6 whereby tongue bars 50 carried by the extensions may enter groove 16 in clamping disc 13. A hydraulic or pneumatic motor 51 connected to upward extension 52 from jaws 45 and 46 permit the latter to be tilted toward the former. A sloping trough 53 for the segments of washer 15 is bracket-mounted on plates 44. When nut 14 is loosened, the segments fall into the trough and slide downwardly therein as shown in FIGURE 6.

Turret 34, in addition to cantilever arm 34b, has a lateral projection 54 at right angles thereto. This projection mounts blade-applying jaws 55 (FIGURE 5) pivoted thereto at 56. The jaws have inner edges adapted to enter groove 16 of a clamping disc of blade 11a, which, in cooperation with a lip 57, support a blade assembly preparatory to placing it on arbor 10. A fluid-pressure motor 58 is connected to the upper ends of the jaws for closing or opening them.

The operation of our apparatus will doubtless be evident from the foregoing but will be briefly summarized here. While blade 11 is in service, ram 20 is retracted and a substitute blade 11a is placed on projection 54 by a crane and held thereon by jaws 55. When the time for blade replacement arrives, ram 20 is accurately alined with arbor 10 by adjusting slide 28, and the ram is advanced by energizing motor 25, until sleeve 40 surrounds nut 14. If jaws 45 and 46 engage clamp disc 13 first, springs 48 will be compressed permitting slight retraction of the jaws longitudinally of arm 34b. A crane hook is connected to blade 11 to suspend it when removed. Jaws 45 and 46 are closed by motor 51 to engage behind the flange in front of the groove 16 in clamp disc 13. Motor 42 is then energized to back off nut 14. As soon as it is loosened, washer segments 15 fall into trough 53. When nut 14 has been backed off to release washer 15, retraction of ram 20 will pull saw blade 11 and its clamping disc 13 axially off of arbor 10, leaving the disc 12 and nut 14 on the arbor and blade assembly 11, 13 suspended from the crane whereby it may be disposed of as desired, after releasing jaws 45 and 46.

Ram 20 is then retracted farther if necessary, to permit arm 34b to clear arbor 10 when turret 34 is rotated. This operation is then effected by motor 35, to bring projection 54 into alinement with the arbor. Ram 20 is again advanced to place the blade 11a and its clamp disc 13a on the arbor. Jaws 55 are then opened and the ram is retracted, leaving the replacement blade assembly on the arbor. Turret 34 is then restored to its original position and ram 20 is then advanced to cause socket 40 to engage nut 14. After manually repositioning the segments of washer 15 on the arbor, and after nut 14 has been re-tightened, ram 20 is again retracted. Another replacement saw-blade assembly is then placed on projection 54 in preparation for the next operation.

It will be apparent that our invention provides power means adequate for handling saw-blade assemblies expeditiously in removing one from its driving arbor and replacing it with another, thus saving a substantial amount of time and eliminating practically all safety hazard.

Although we have disclosed herein the preferred embodiment of our invention, we intend to cover as well any change or modification therein which may be made without departing from the spirit and scope of the invention as set forth in the claims.

What is claimed is:

1. Disc-handling apparatus comprising a base, a ram traversible longitudinally along said base axially from and toward a shaft adapted to receive a disc on the end thereof, means for reciprocating said ram, a cylinder upstanding on said ram, a turret rotatable in said cylinder, means for rotating said turret, and disc-gripping jaws extending laterally from said turret.

2. Disc-handling apparatus comprising a base, a ram traversible longitudinally along said base axially from and toward a shaft adapted to receive a disc on the end thereof, means for reciprocating said ram, a cylinder upstanding on said ram, a turret rotatable in said cylinder, means for rotating said turret, and a power-driven socket wrench projecting laterally from said turret, adapted to aline with said shaft.

3. Apparatus as defined by claim 2, characterized by a washer trough below said wrench adapted to receive washer segments from said shaft.

4. Apparatus as defined by claim 2, characterized by a cantilever arm on said turret, said wrench being mounted on said arm.

5. Apparatus as defined by claim 2, characterized by a cross slide on said ram, said turret being disposed on said slide.

6. Apparatus as defined by claim 2, characterized by said rotating means being a motor in said cylinder.

7. Apparatus as defined by claim 2, characterized by a cantilever arm on said turret, yieldable mounts at the outer end of said arm, and disc-gripping jaws supported on said mounts.

References Cited
UNITED STATES PATENTS

| | | | |
|---|---|---|---|
| 3,355,797 | 12/1967 | Lohneis | 29—568 |
| 3,191,294 | 6/1965 | Dougherty | 29—568 |

FRANCIS S. HUSAR, Primary Examiner

U.S. Cl. X.R.

29—568; 81—57